(No Model.)
B. U. HIESTER.
MUZZLE.
No. 375,631. Patented Dec. 27, 1887.
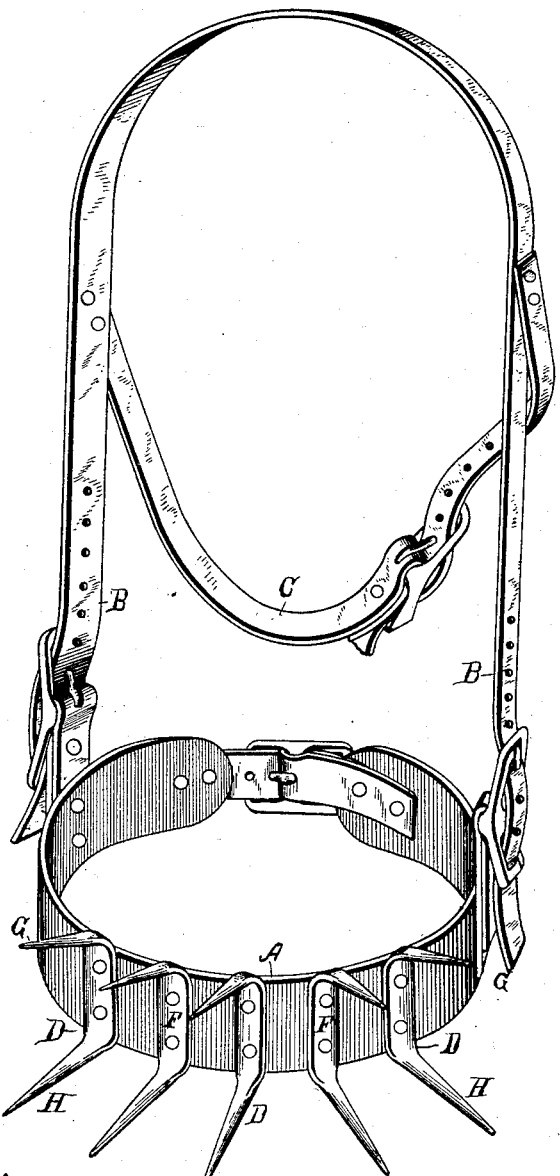
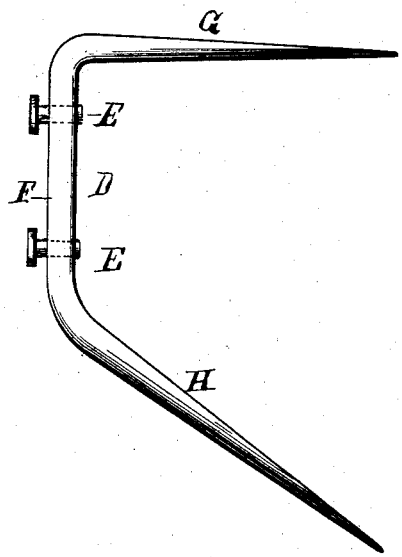

UNITED STATES PATENT OFFICE.

BARENT U. HIESTER, OF FARM RIDGE, ILLINOIS.

MUZZLE.

SPECIFICATION forming part of Letters Patent No. 375,631, dated December 27, 1887.

Application filed February 18, 1887. Serial No. 228,136. (No model.)

*To all whom it may concern:*

Be it known that I, BARENT U. HIESTER, of Farm Ridge, in the county of La Salle and State of Illinois, have invented certain new and useful Improvements in Muzzles to Prevent Calves and Colts from Sucking; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a front perspective view of my improved muzzle, and Fig. 2 is a detail view of one of the spikes detached.

My invention relates to that class of muzzles in which sharpened spikes are secured to the noze-piece to prevent calves and colts from sucking their mothers when it is desired to wean them; and it consists in the improved construction of the spikes and the means of securing them to the nose-piece, as will be hereinafter more fully described, and pointed out in the claim.

In the accompanying drawings. A indicates the noze-piece of the muzzle, B the cheek-straps, and C the throat-latch, all of which may be of the ordinary construction; or the noze-piece may be provided with a strap and buckle to permit of its being adjusted to different-sized animals, and for the purpose of securing a close fit upon the nose of the animal, which will thus prevent its being moved out of the way. The nose-piece is preferably made wider than the ordinary width, for the purpose of giving a better securement for the spikes D, which are secured to its front portion by means of two rivets, E E, although they can be secured in any other substantial manner. Each of these spikes is composed of a single piece of metal having its main portion F flattened and provided with perforations, through which the rivets are passed to secure them to the nose-piece, and having their ends G and H bent at angles to the main portion. I prefer to have the ends of these spikes, which are sharpened, to project at different angles from the main portion—that is, have the upper one of them, G, preferably bent about a right angle to the main portion, while the other end, H, can be bent at an obtuse angle, so as to project over the nose of the animal more than it would do if it were bent at a right angle. By constructing them in this manner it will be impossible for the animal to reach the teats of its mother without causing some of the points of the spikes to stick her, which will cause her to move away, or to drive the young one away.

Having thus described my invention, I claim—

The combination, with the nose-piece of a muzzle, of a series of spikes secured thereto, each spike having its ends bent at angles therefrom, one of the ends being at about a right angle and the other one at an obtuse angle.

In testimony that I claim the foregoing I have hereunto set my hand this 14th day of February, 1887.

BARENT U. HIESTER.

Witnesses:
JESSE B. RUGER,
JAMES F. GALVIN.